United States Patent
Seo

(10) Patent No.: US 8,823,698 B2
(45) Date of Patent: Sep. 2, 2014

(54) METHOD AND APPARATUS FOR 3D PATH

(75) Inventor: Jung Kak Seo, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 359 days.

(21) Appl. No.: 12/992,173

(22) PCT Filed: Jun. 30, 2008

(86) PCT No.: PCT/KR2008/003805
§ 371 (c)(1),
(2), (4) Date: Nov. 11, 2010

(87) PCT Pub. No.: WO2009/138520
PCT Pub. Date: Nov. 19, 2009

(65) Prior Publication Data
US 2011/0074774 A1 Mar. 31, 2011

(30) Foreign Application Priority Data
May 14, 2008 (KR) .................. 10-2008-0044673

(51) Int. Cl.
*G06T 15/00* (2011.01)
*G06T 17/20* (2006.01)
(52) U.S. Cl.
CPC ............................... *G06T 17/20* (2013.01)
USPC ........................................................ 345/419

(58) Field of Classification Search
CPC ......... G06T 19/00; G06T 17/20; G06T 17/00; G06T 15/10; G06T 15/00
See application file for complete search history.

(56) References Cited

U.S. PATENT DOCUMENTS

| 5,179,638 A | 1/1993 | Dawson et al. |
| 6,256,038 B1 * | 7/2001 | Krishnamurthy ............. 345/419 |
| 6,587,104 B1 * | 7/2003 | Hoppe .......................... 345/423 |
| 7,158,138 B1 * | 1/2007 | Bronskill et al. .............. 345/441 |
| 2002/0167523 A1 | 11/2002 | Taylor et al. |
| 2003/0160799 A1 | 8/2003 | Emberling et al. |
| 2006/0224311 A1 * | 10/2006 | Watanabe et al. ............. 701/208 |
| 2007/0133031 A1 * | 6/2007 | Takaragi et al. ............. 358/1.13 |
| 2007/0216711 A1 * | 9/2007 | Smith et al. ................... 345/649 |

FOREIGN PATENT DOCUMENTS

KR  10-1995-0019136 A  7/1995

* cited by examiner

*Primary Examiner* — Kee M Tung
*Assistant Examiner* — Frank Chen
(74) *Attorney, Agent, or Firm* — Fox Rothschild LLP

(57) ABSTRACT

An apparatus and method for generating a three-dimensional (3D) path are provided. The apparatus includes: a polygon generation unit to generate a left polygon and a right polygon on the left and the right of path data, respectively, based on a linear interpolation point of the path data; and a polygon conversion unit to apply a height value to the linear interpolation point based on the left polygon and the right polygon and to thereby generate the 3D path.

15 Claims, 11 Drawing Sheets

(PRIOR ART)

METHOD AND APPARATUS FOR 3D PATH

CROSS-REFERENCE TO RELATED APPLICATIONS

This application is the U.S. national stage application of International Patent Application No. PCT/KR2008/003805, filed Jun. 30, 2008, which claims priority to Korean Application No. 10-2008-0044673, filed May. 14, 2008, the disclosures of each of which are incorporated herein by reference in their entirety.

1. Technical Field

The present invention relates to a method and apparatus for generating a three-dimensional (3D) path.

2. Background Art

Along with the development of location tracking technologies, a path display terminal that may generate and display a path from a current location to a destination is commercialized. In general, the path display terminal may verify its location using a Global Positioning System (GPS), retrieve map information from a location of the path display terminal to a destination, and generate and display an optimal path.

The conventional path display terminal two-dimensionally displays buildings around a road corresponding to the map information and thus may not display a characteristic appearance of the buildings.

In order to overcome the above limit, there is provided a method that may display a path of the path display terminal on a three-dimensional (3D) map. However, in this case, as a distance becomes more distant from the path display terminal, the road or the path may be displayed to be smaller. Therefore, an existing method of displaying a 2D path may not recognize a change in the path at a location that is away from the path display terminal by greater than a predetermined distance.

FIG. 1 illustrates an example of a 2D path display for guiding a left turn on a 3D path display terminal.

The 3D path display terminal may display a path 102 from its current location to a destination on a map 101 that is generated based on map information. As shown in FIG. 1, when the path 102 turns left, a left-turn path 103 is indicated by a solid line. Therefore, it may be difficult for a user to recognize in which direction the path 102 turns.

Accordingly, there is a need for a path display method that may easily recognize a turn section in a 3D map where an image becomes smaller as a distance becomes more distinct by applying a far-and-near expression.

DISCLOSURE OF INVENTION

Technical Goals

An aspect of the present invention provides a method and apparatus for generating a three-dimensional (3D) path that may generate a 3D path by assigning a height value to a linear interpolation point of path information and thereby may recognize a heading direction of a path using a thickness of the 3D path.

Technical Solutions

According to an aspect of the present invention, there is provided an apparatus for generating a three-dimensional (3D) path, the apparatus including: a polygon generation unit to generate a left polygon and a right polygon on the left and the right of path data, respectively, based on a linear interpolation point of the path data; and a polygon conversion unit to apply a height value to the linear interpolation point based on the left polygon and the right polygon and to thereby generate the 3D path.

In this instance, the apparatus may further include: an inappropriate data removal unit to remove an inappropriate linear interpolation point in the path data and to provide, to the polygon generation unit, the path data in which the inappropriate linear interpolation point is removed.

Also, the polygon generation unit may calculate a left direction vector and a right direction vector at the linear interpolation point, generate a left polygon point and a right polygon point at the left and the right of the linear interpolation point, based on the left direction vector and the right direction vector, respectively, connect the linear interpolation point and the left polygon point to thereby generate the left polygon, and connect the linear interpolation point and the right polygon point to thereby generate the right polygon.

According to another aspect of the present invention, there is provided a method of generating a 3D path, the method including: generating a left polygon and a right polygon on the left and the right of path data, respectively, based on a linear interpolation point of the path data; and applying a height value to the linear interpolation point based on the left polygon and the right polygon to thereby generate the 3D path.

Advantageous Effect

According to embodiments of the present invention, there is provided a method and apparatus for generating a three-dimensional (3D) path that may generate a 3D path by assigning a height value to a linear interpolation point of path information and thereby may recognize a heading direction of a path using a thickness of the 3D path.

BEST MODE FOR CARRYING OUT THE INVENTION

Figure 1:
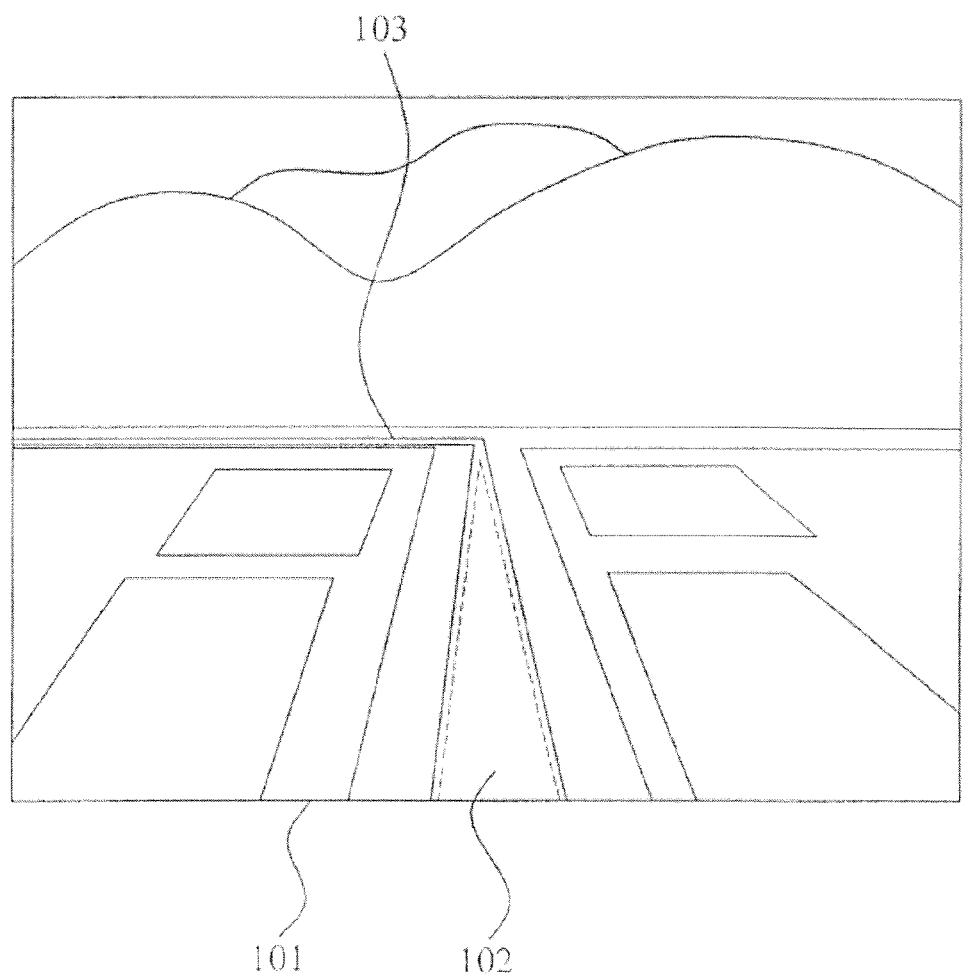
FIG. 1 illustrates an example of a two-dimensional (2D) path display for guiding a left turn on a three-dimensional (3D) display terminal according to a conventional art.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
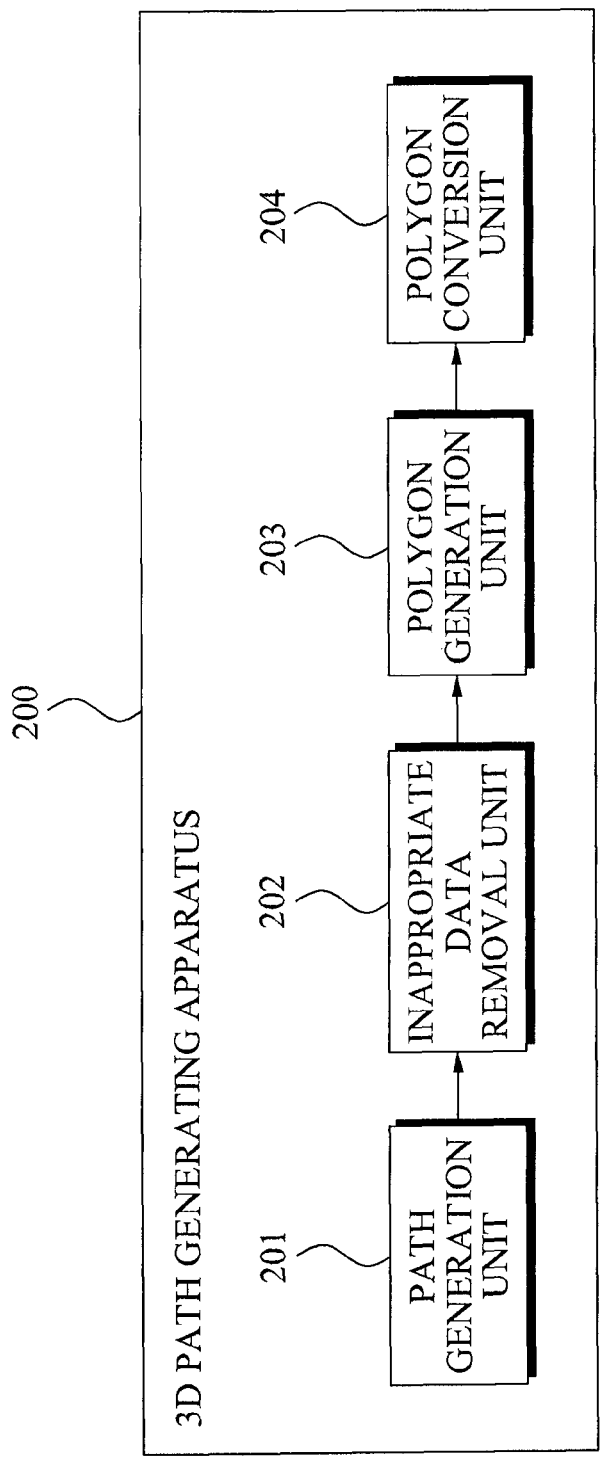
FIG. 2 is a block diagram illustrating an apparatus for generating a 3D path according to an embodiment of the present invention.

FIG. 2 is a block diagram illustrating an apparatus 200 for generating a three-dimensional (3D) path according to an embodiment of the present invention.

A path generation unit 201 may provide path data associated with a path to an inappropriate data removal unit 202. The inappropriate data removal unit 202 may remove an inappropriate linear interpolation data in the path data and provide a polygon generation unit 203 with the path data in which the inappropriate linear interpolation data is removed. The polygon generation unit 203 may generate a left polygon and a right polygon on the left and the right of the path data, respectively, based on a linear interpolation point of the path data. A polygon conversion unit 204 may apply a height value to the linear interpolation point based on the left polygon and the right polygon and thereby generate the 3D path.

The path generation unit 201 may perform texture-mapping for map data between a location of a user having the 3D path generating apparatus 200 and a destination to thereby generate a 3D map. The path generation unit 201 may generate a path from the location of the user to the destination on the 3D map, using a general path line algorithm.

The linear interpolation point denotes a point where a curve occurs in the path. Thus, a single linear interpolation point may express only a path that is curved at a predetermined angle. Accordingly, although a distance is the same, a plurality of linear interpolation points may be included in a section that is significantly curved such as a turn section. A small number of linear interpolation points may be included in a straight line section that is a relatively less curved.

When a plurality of linear interpolation points exists in the path data within a predetermined distance, the inappropriate data removal unit 202 may select any one linear interpolation point from the plurality of linear interpolation points, and determine the remaining linear interpolation points as inappropriate linear interpolation points to thereby remove the determined inappropriate linear interpolation points. Also, when a retrograde linear interpolation point against a heading direction of a path exists in the path data, the inappropriate data removal unit 202 may determine the retrograde linear interpolation point as an inappropriate linear interpolation point to thereby remove the determined inappropriate linear interpolation point.

The polygon generation unit 203 may calculate a left direction vector and a right direction vector at the linear interpolation point, and generate a left polygon point and a right polygon point at the left and the right of the linear interpolation point, respectively, based on the left direction vector and the right direction vector, respectively. Also, the polygon generation unit 203 may connect the linear interpolation point and the left polygon point to thereby generate the left polygon, and connect the linear interpolation point and the right polygon point to thereby generate the right polygon.

The polygon generation unit 203 may rotate a heading direction vector of a first linear interpolation point of the path data at a designated angle to thereby calculate a first left direction vector and a first right direction vector. The polygon generation unit 203 may generate the left polygon point and the right polygon point at points that are moved from the first linear interpolation point to the left and the right thereof by a predetermined distance in correspondence to the first left direction vector and the first right direction vector.

The polygon generation unit 203 may calculate a heading left direction vector and a heading right direction vector at another linear interpolation point excluding the first linear interpolation point and a last linear interpolation point of the path data based on an angle difference between linear interpolation points. Here, the linear interpolation points may exclude the first linear interpolation point and the last linear interpolation point. The polygon generation unit 203 may generate the left polygon point at an intersecting point between a straight line corresponding to the heading left direction vector and a straight line corresponding to the heading direction of the path data based on a left polygon point that is generated at a previous linear interpolation point, and generate the right polygon point at an intersecting point between a straight line corresponding to the heading right direction vector and a straight line corresponding to the heading direction of the path data based on a right polygon point that is generated at the previous linear interpolation point, based on the other linear interpolation point excluding the first linear interpolation and the last inter interpolation point.

The polygon generation unit 203 may rotate a heading direction vector of the last linear interpolation point of the path data at a designated angle to thereby calculate a last left direction vector and a last right direction vector. The polygon generation unit 203 may generate the left polygon point and the right polygon point at points that are moved from the last linear interpolation point to the left and the right thereof by a predetermined distance in correspondence to the last left direction vector and the last right direction vector. Here, the designated angle may be 90 degrees.

The polygon conversion unit 204 may apply the height value to the linear interpolation point to thereby generate a 3D path vertex. Also, the polygon conversion unit 204 may connect the left polygon and the right polygon to the 3D path vertex to thereby generate the 3D path. The polygon conversion unit 204 may triangulate the 3D path to thereby increase a 3D effect.

Figure 3:
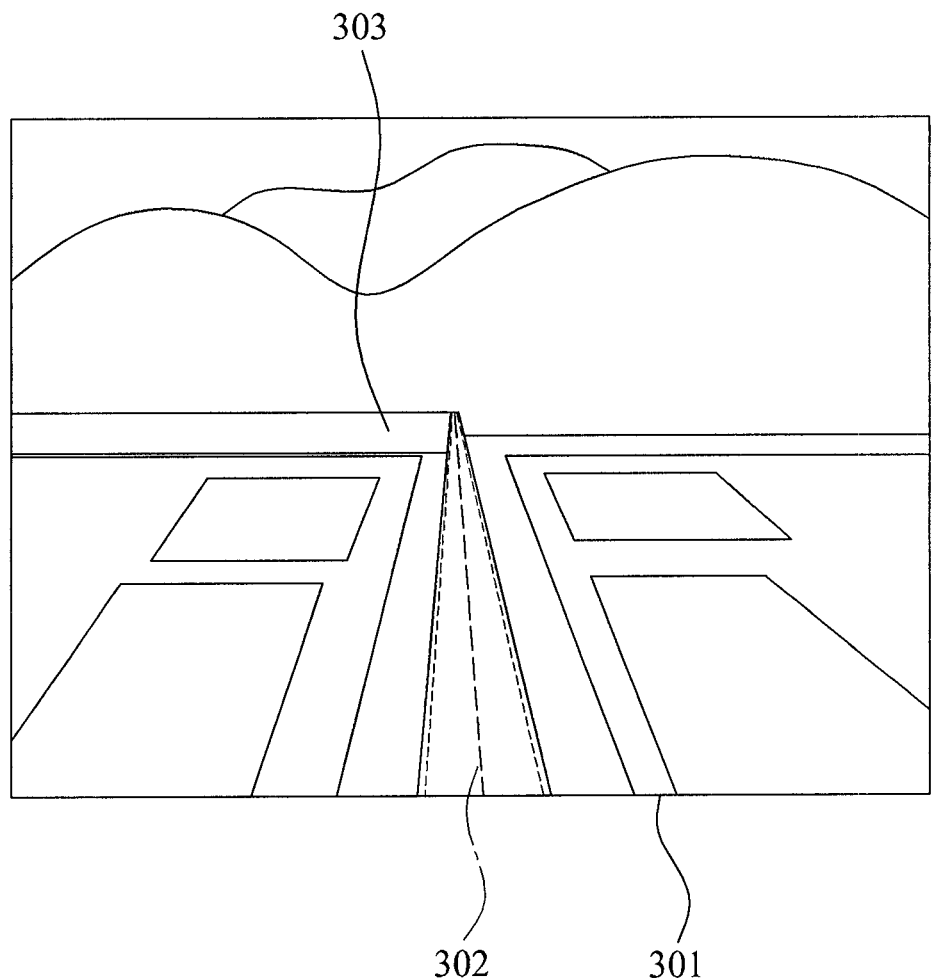
FIG. 3 illustrates an example of a 2D path display for guiding a left turn using an apparatus for generating a 3D path according to an embodiment of the present invention.

FIG. 3 illustrates an example of a 2D path display for guiding a left turn using the 3D path generating apparatus 200 according to an embodiment of the present invention.

The 3D path generating apparatus 200 may display a 3D path 302 from its location to a destination on a 3D map 301 that is generated based on map information. The 3D path 302 is three-dimensionally displayed to have a triangular section. Thus, as shown in FIG. 3, when the 3D path 302 turns left, a side surface of a left-turn 3D path 303 may be indicated on the 3D map 301. Accordingly, a user may easily recognize in which direction the 3D path 302 turns.

As described above, according to an embodiment of the present invention, a path may be three-dimensionally displayed. Specifically, when a direction of the path is changed, a side surface of the path to be changed may be displayed.

Therefore, the user may readily recognize information regarding in which direction to turn.

Figure 4:
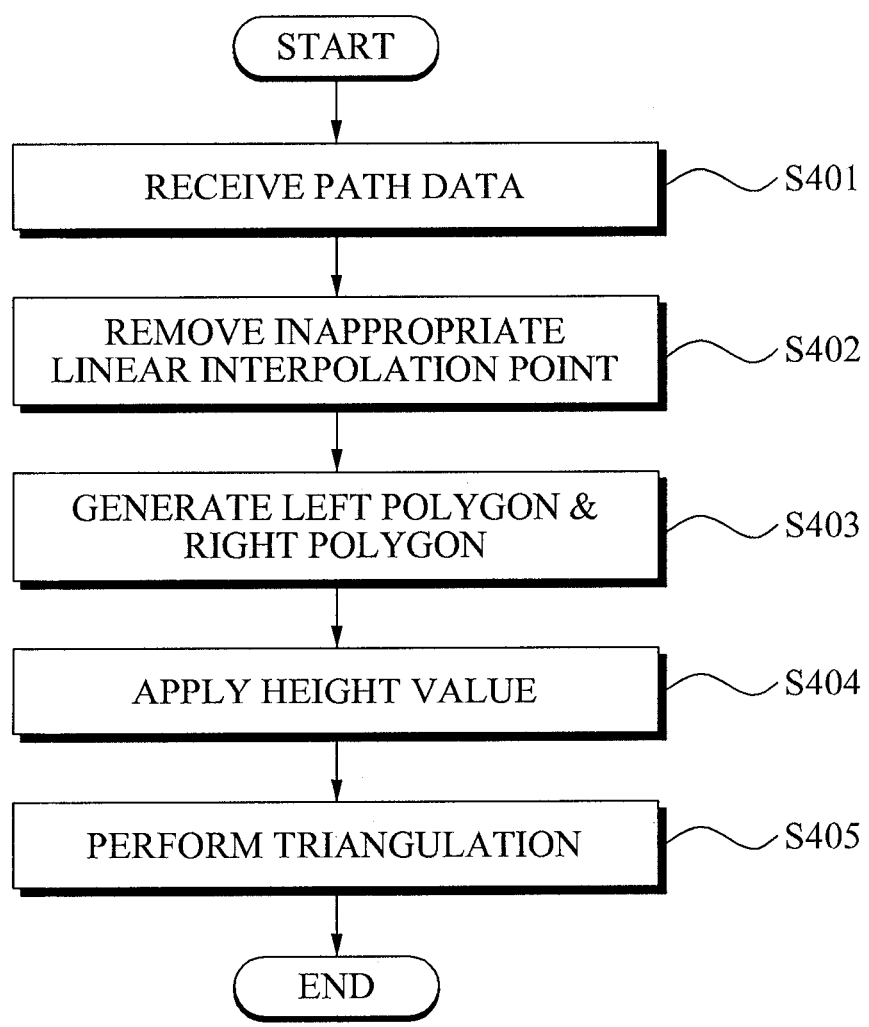
FIG. 4 is a flowchart illustrating a method of generating a 3D path according to an embodiment of the present invention.

FIG. 4 is a flowchart illustrating a method of generating a 3D path according to an embodiment of the present invention. The method may be performed by the 3D path generating apparatus 200 of FIG. 2.

In operation S401, the inappropriate data removal unit 202 may receive path data from the path generation unit 201. Here, the received path data may include a linear interpolation point.

In operation S402, the inappropriate data removal unit 202 may remove, in the received path data, a linear interpolation point inappropriate for generating of the 3D path, that is, an inappropriate linear interpolation point.

When a plurality of linear interpolation points exists in the path data within a predetermined distance, the inappropriate data removal unit 202 may select any one linear interpolation point from the plurality of linear interpolation points, and determine the remaining linear interpolation points as inappropriate linear interpolation points to thereby remove the determined inappropriate linear interpolation points in the path data. Through this, it is possible to prevent a direction of the path from continuously changing or switching within the predetermined distance.

When a retrograde linear interpolation point against a heading direction of the path exists in the path data, the inappropriate data removal unit 202 may determine the retrograde linear interpolation point as an inappropriate linear interpolation point to thereby remove the determined inappropriate linear interpolation point. Through this, it is possible to prevent the path from partially retrograding.

In operation S403, the polygon generation unit 203 may generate a left polygon and a right polygon on the left and the right of the path data, respectively, based on a linear interpolation point of the path data in which the inappropriate linear interpolation point is removed. A method of generating the left polygon and the right polygon will be further described in detail with reference to FIG. 8.

In operation S404, the polygon conversion unit 204, the polygon conversion unit 204 may apply a height value to the linear interpolation point based on the left polygon and the right polygon and thereby may generate the 3D path. The polygon conversion unit 204 may apply the height value to the linear interpolation point to thereby generate a 3D path vertex, and connect the left polygon and the right polygon to the 3D path vertex to thereby generate the 3D path.

In operation S405, the polygon conversion unit 204 may triangulate the 3D path to thereby display the 3D path in a 3D form.

Since minimum data of information that may be processed at a graphic accelerator for displaying the 3D form on a screen is a triangle, that is, a polygon, a triangulation process is required in order to display the 3D path in the 3D form.

Hereinafter, the verified method of generating the 3D path will be further described in detail with reference to FIGS. 5 through 11.

Figure 5:
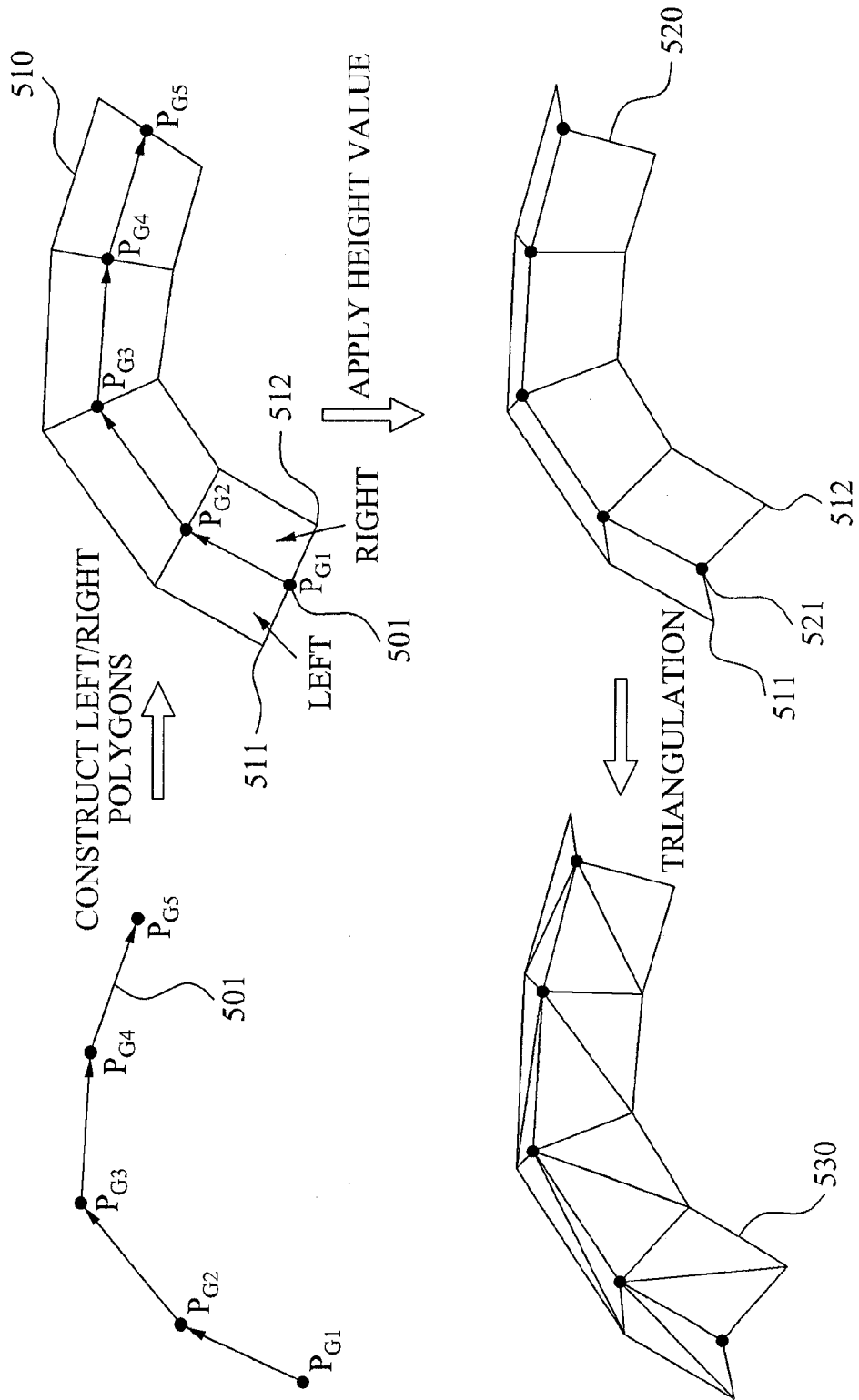
FIG. 5 illustrates an example of indicating a path form in a process of generating a 3D path according to an embodiment of the present invention.

FIG. 5 illustrates an example of indicating a path form in a process of generating a 3D path according to an embodiment of the present invention.

The polygon generation unit 203 may generate a left polygon point 511 and a right polygon point 512 based on the left and the right of path data 501 based on a linear interpolation point of the path data 501. Here, an inappropriate linear interpolation point is removed in the path data 501 by the inappropriate data removal unit 202. The polygon generation unit 203 may generate a left polygon by connecting the left polygon point 511 and the linear interpolation point of the path data 501. Also, the polygon generation unit 203 may generate a right polygon by connecting the right polygon point 512 and the linear interpolation point of the path data 501. Here, the generated path may be a relatively wide 2D path 510 based on the path data 501.

The polygon conversion unit 204 may generate a 3D path vertex 521 by applying the height value to the linear interpolation point of the path data 501, and may generate a 3D path 520 by connecting the left polygon point 511 and the right polygon point 512 to the 3D path vertex 521.

The polygon conversion unit 204 may display the 3D path in a 3D form 530 by triangulating the 3D path.

Figure 6:
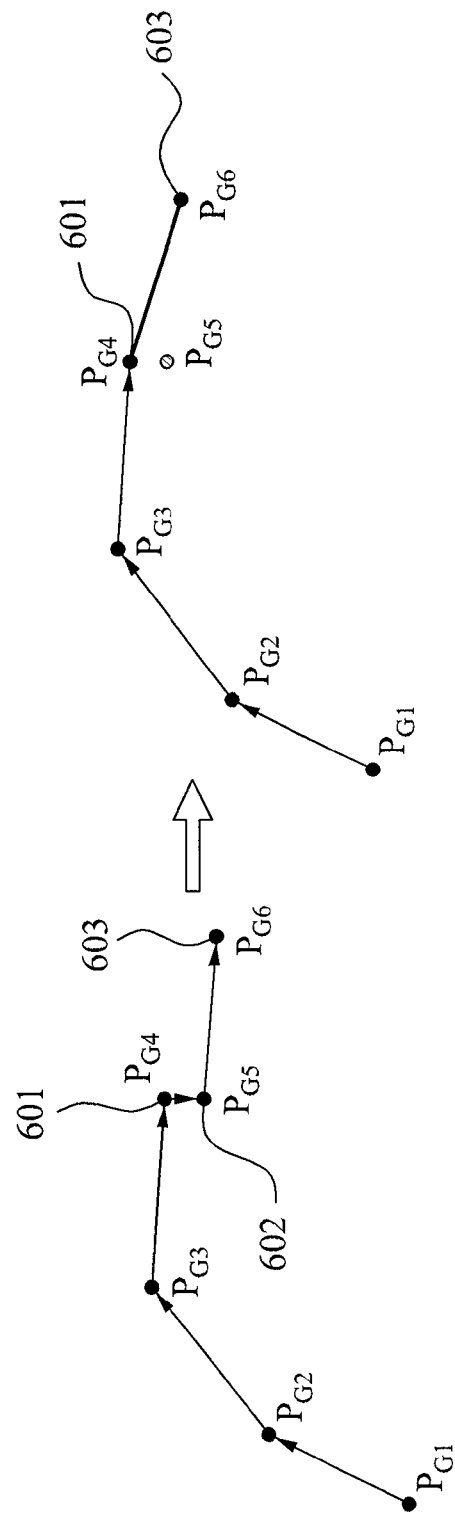
FIG. 6 illustrates an example of a process of removing an inappropriate linear interpolation point when a plurality of linear interpolation points exists within a predetermined section according to an embodiment of the present invention.

FIG. 6 illustrates an example of a process of removing an inappropriate linear interpolation point when a plurality of linear interpolation points exists within a predetermined section according to an embodiment of the present invention.

When another linear interpolation point $P_{G5}$ 602 exists within a predetermine distance from one linear interpolation point $P_{G4}$ 601 among the plurality of linear interpolation points of path data, a portion of left and right polygon points required for construction of left and right polygons may be overlapped with each other, or may be positioned in a crossing location. Therefore, the inappropriate data removal unit 202 may remove any one between the linear interpolation points $P_{G4}$ 601 and $P_{G5}$ 602.

In the above example, the inappropriate data removal unit 202 removes the $P_{G5}$ 602 and connects the linear interpolation point $P_{G4}$ 601 and a linear interpolation point $P_{G6}$ 603 followed by the linear interpolation point $P_{G5}$ 602.

Figure 7:
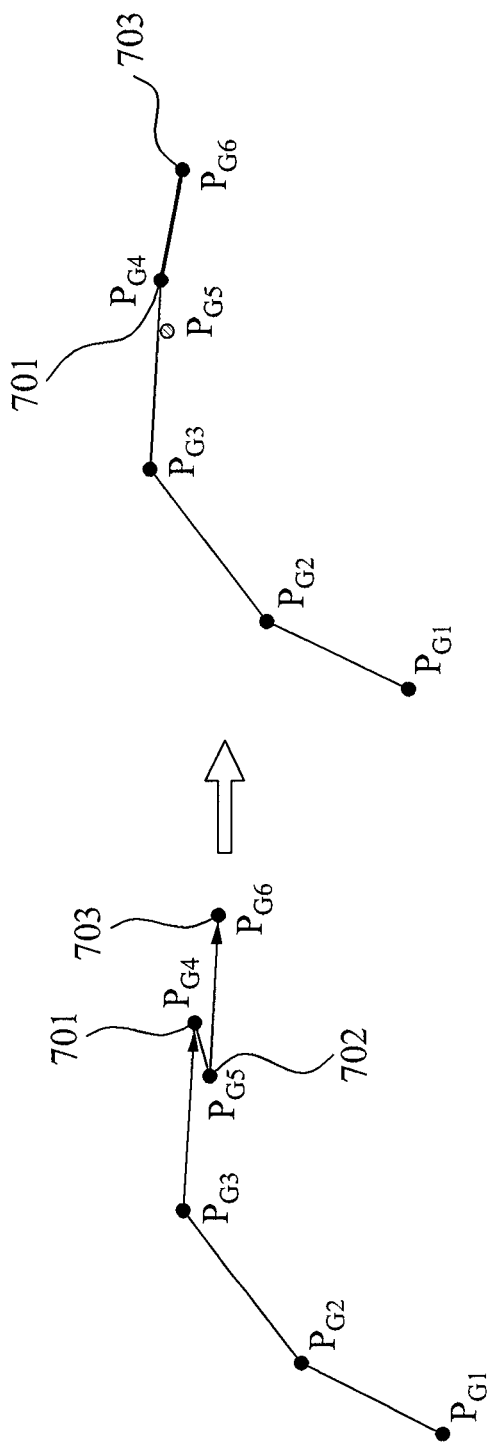
FIG. 7 illustrates an example of a process of removing an inappropriate linear interpolation point when a retrograde linear interpolation point against a heading direction of path exists according to an embodiment of the present invention.

FIG. 7 illustrates an example of a process of removing an inappropriate linear interpolation point when a retrograde linear interpolation point against a heading direction of path exists according to an embodiment of the present invention.

When a linear interpolation point $P_{G5}$ 702 followed by one linear interpolation point $P_{G4}$ 701 among a plurality of linter interpolation points of path data retrogrades against a heading direction of the path data and thereby is positioned in a closer location to the 3D path generating apparatus 200 than the linear interpolation point $P_{G4}$ 701, a portion of left and right polygon points required for construction of left and right polygons may be overlapped with each other, or may be positioned in a crossing location. Therefore, the inappropriate data removal unit 202 may remove the retrograde linear interpolation point $P_{G5}$ 702.

The inappropriate data removal unit 202 may connect the linear interpolation point $P_{G4}$ 701 and a linear interpolation point $P_{G6}$ 703 followed by the linear interpolation point $P_{G5}$ 702, instead of the linear interpolation point $P_{G5}$ 702.

Figure 8:
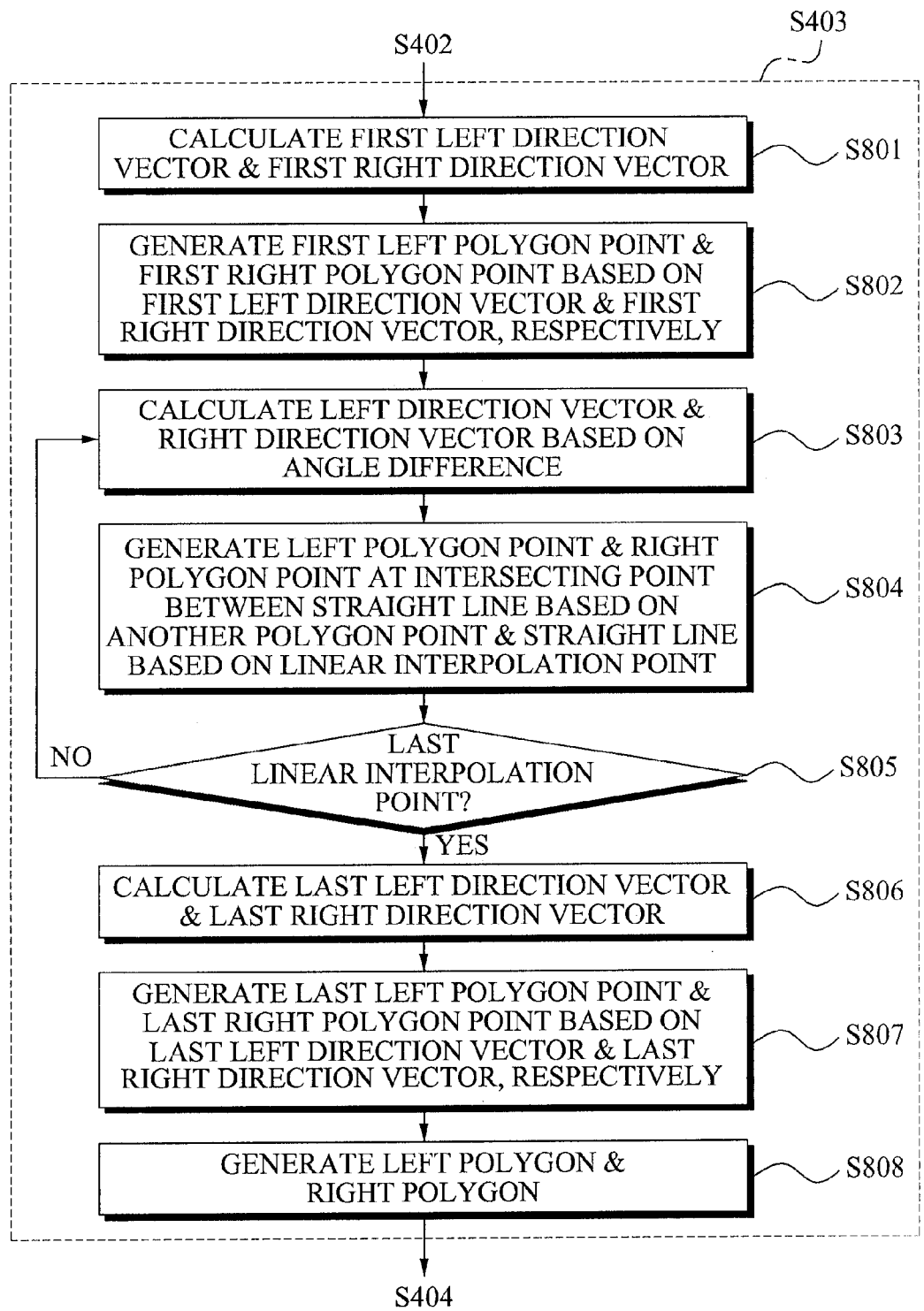
FIG. 8 is a flowchart illustrating a method of generating a left polygon and a right polygon according to an embodiment of the present invention.

FIG. 8 is a flowchart illustrating a method of generating a left polygon and a right polygon according to an embodiment of the present invention. Here, operations S801 through S808 may be included in operation S403 of FIG. 4 and thereby be performed.

In operation S801, the polygon generation unit 203 may calculate a first left direction vector and a first right direction vector at a first linear interpolation point based on a direction vector of the first linear interpolation point of path data. The direction vector of the linear interpolation vector may be a direction vector between a current linear interpolation point and a subsequent linear interpolation point.

The polygon generation unit 203 may calculate the first left direction vector by rotating the direction vector of the first linear interpolation point by 90 degrees, and calculate the first right direction vector by rotating the direction vector of the first linear interpolation point by −90 degrees.

In operation S802, the polygon generation unit 203 may generate a first left polygon point and a first right polygon point based on the calculated first left direction vector and the first right direction vector, respectively.

The polygon generation unit 203 may generate the first left polygon point at a point that is moved from the first linear interpolation point along the first left direction vector by a thickness of a polygon. Also, the polygon generation unit 203 may generate the first right polygon points at a point that is moved from the first linear interpolation point along the first right direction vector by the thickness of the polygon.

In operation S803, the polygon generation unit 203 may calculate a left direction vector and a right direction vector at another linear interpolation point excluding the first linear interpolation point of the path data, based on an angle difference between linear interpolation points. Here, the linear interpolation points may exclude the first linear interpolation point and the last linear interpolation point. The polygon generation unit 203 may calculate the left direction vector using a difference between a direction vector of a subsequent linear interpolation point and a direction vector of the other linear interpolation point. Also, the polygon generation unit 203 may calculate the right direction vector using the difference between the direction vector of the subsequent linear interpolation point and the direction vector of the other linear interpolation point. In operation S804, the polygon generation unit 203 may generate the left polygon point at an intersecting point between a straight line corresponding to the heading left direction vector and a straight line corresponding to the heading direction of the path data based on a left polygon point that is generated at a previous linear interpolation point, and generate the right polygon point at an intersecting point between a straight line corresponding to the heading right direction vector and a straight line corresponding to the heading direction of the path data based on a right polygon point that is generated at the previous linear interpolation point, based on the other linear interpolation point excluding the first linear interpolation and the last inter interpolation point.

When the linear interpolation point is a second linear interpolation point, the polygon generation unit 203 may generate a second left polygon point at an intersecting point between a straight line that is generated from the first left polygon point along a first direction vector and a straight line that is generated from the second linear interpolation point along a second left direction vector. Also, the polygon generation unit 203 may generate a second right polygon point at an intersecting point between a straight line that is generated from the first right polygon point along the first direction vector and a straight line that is generated from the second linear interpolation point along the second right direction vector.

In operation S805, the polygon generation unit 203 may verify whether it is an order to calculate a direction vector at a last linear interpolation point of the path data. When the current linear interpolation point is not the last linear interpolation point, operation S803 may be performed again.

Conversely, when the current linear interpolation point is the last linear interpolation point, the polygon generation unit 203 may calculate a last left direction vector and a last right direction vector of the last linear interpolation point based on a direction vector of the last linear interpolation point of the path data in operation S806.

The polygon generation unit 203 may generate the last left direction vector by rotating the direction vector of the last linear interpolation point by 90 degrees and may calculate the last right direction vector by rotating the direction vector of the last linear interpolation point by −90 degrees.

In operation S807, the polygon generation unit 203 may generate a last left polygon point and a last right polygon point based on the calculated last left direction vector and the last right direction vector, respectively.

The polygon generation unit 203 may generate the last left polygon point at a point that is moved from the last linear interpolation point along the last left direction vector by a thickness of a polygon and may generate the last right polygon point at a point that is moved from the last linear interpolation point along the last right direction vector by the thickness of the polygon.

In operation S808, the polygon generation unit 203 may generate a left polygon by connecting the left polygon point and the linear interpolation point and may generate a right polygon by connecting the right polygon point and the linear interpolation point.

Figure 9:
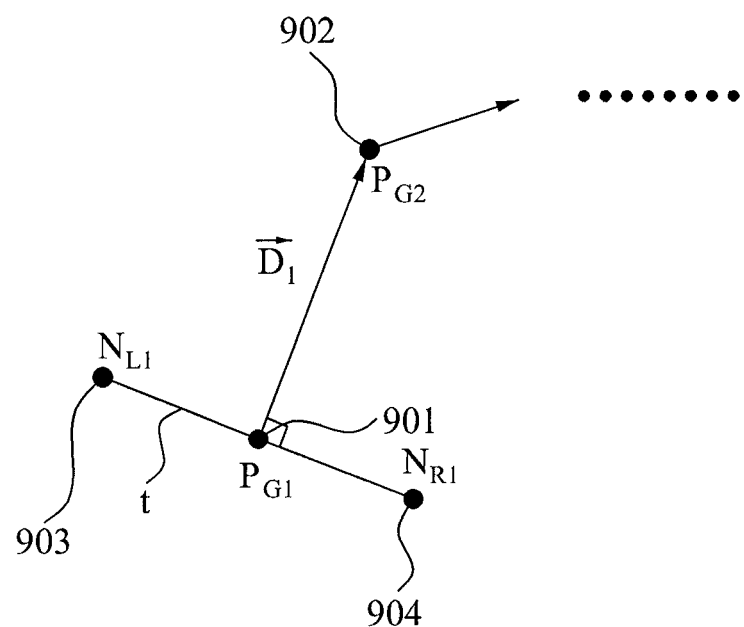
FIG. 9 illustrates an example of a process of generating a left polygon point and a right polygon point at a first linear interpolation point according to an embodiment of the present invention.

FIG. 9 illustrates an example of a process of generating a left polygon point and a right polygon point at a first linear interpolation point according to an embodiment of the present invention.

The polygon generation unit 203 may calculate a direction vector $D_1$ from a first linear interpolation point $P_{G1}$ 901 to a second linear interpolation point $P_{G2}$ 902. The polygon generation unit 203 may calculate a first left direction vector and a first right direction vector by multiplying the direction vector $D_1$ and a conversion matrix R for rotation a direction vector at a designated angle.

Here, the conversion matrix R for calculating the first left direction vector may be a 90-degree conversion matrix and the conversion matrix R for calculating the first right direction vector may be a −90-degree conversion matrix.

The polygon generation unit 203 may generate a first left polygon point $N_{L1}$ 903 by multiplying the first left direction vector and a thickness t of a polygon and then adding up the result of the multiplication and the first linear interpolation point $P_{G1}$ 901. Also, the polygon generation unit 203 may generate a first right polygon point $N_{R1}$ 903 by multiplying the first right direction vector and the thickness t of the polygon and then adding up the result of the multiplication and the first linear interpolation point $P_{G1}$ 901.

Figure 10:
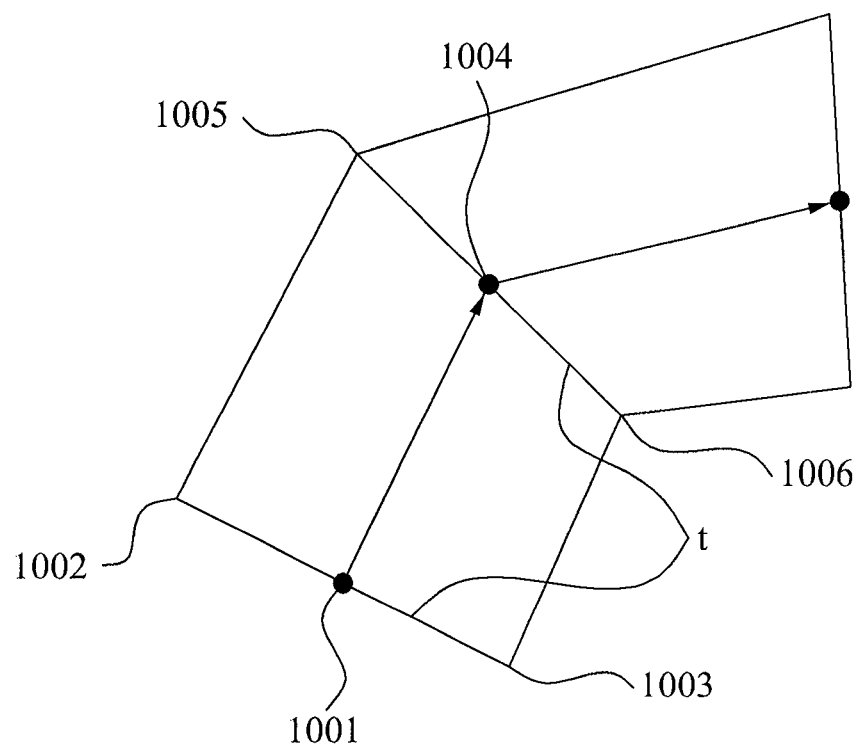
FIG. 10 illustrates an example of applying, to another linear interpolation point, a process of generating a left polygon point and a right polygon point at a first linear interpolation point according to an embodiment of the present invention.

FIG. 10 illustrates an example of applying, to another linear interpolation point, a process of generating a left polygon point and a right polygon point at a first linear interpolation point according to an embodiment of the present invention.

The polygon generation unit 203 may generate a left polygon point (1) 1002 and a right polygon point (1) 1003 at locations that are moved from a linear interpolation point (1) 1001 to the left and the right thereof by a thickness t of a polygon, respectively. Also, the polygon generation unit 203 may generate a left polygon point (2) 1005 and a right polygon point (2) 1006 at locations that are moved from a linear interpolation point (2) 1004 to the left and the right thereof by the thickness t of the polygon, respectively. In this case, although a distance between the right polygon point (2) 1006 and the linear interpolation point (2) 1004 is the same as a distance between the right polygon point (1) 1003 and the linear interpolation point (1) 1001, a right polygon using the right polygon point (2) 1006 may be in a concave form with respect to the left.

Accordingly, the first linear interpolation point and the other linear interpolation point may be calculated using different schemes.

Figure 11:
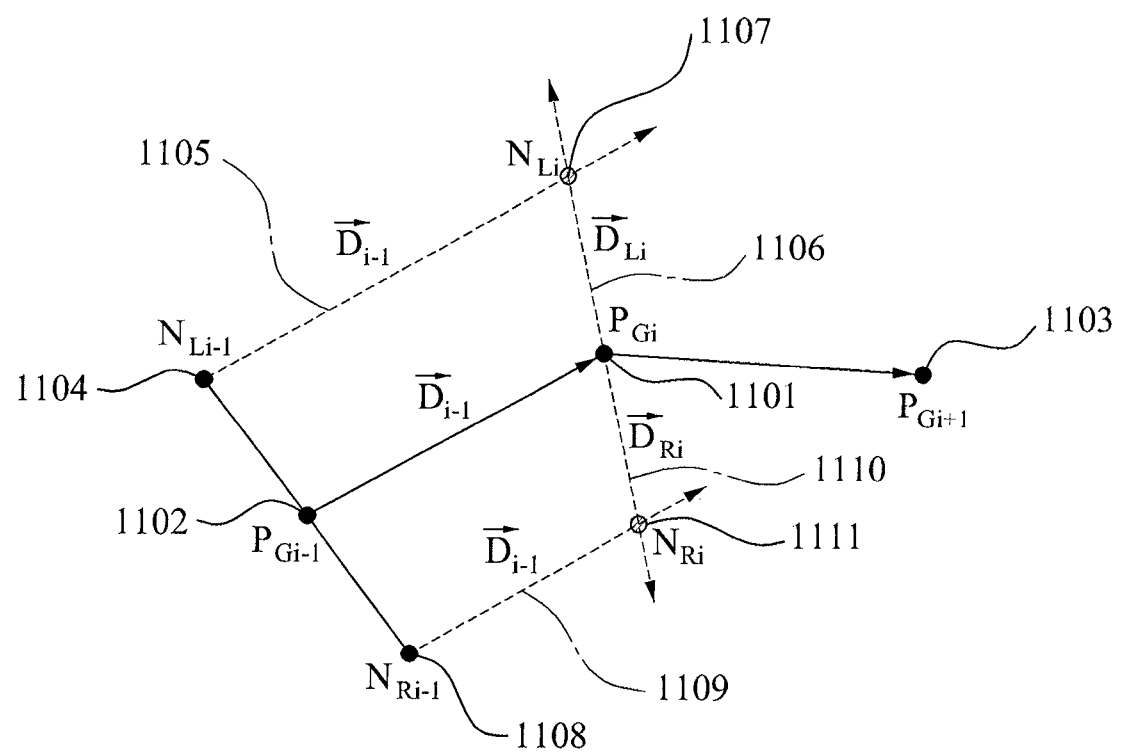
FIG. 11 illustrates an example of a process of generating a left polygon point and a right polygon point at another linear interpolation point excluding a first linear interpolation point or a last linear interpolation point according to an embodiment of the present invention.

FIG. 11 illustrates an example of a process of generating a left polygon point and a right polygon point at a linear interpolation point $P_{Gi}$ 1101 excluding a first linear interpolation point or a last linear interpolation point according to an embodiment of the present invention.

The polygon generation unit 203 may calculate a direction vector $D_{i-1}$ from a previous linear interpolation point $P_{Gi-1}$ 1101 of the linear interpolation point $P_{Gi}$ 1101 to the linear interpolation point $P_{Gi}$ 1101, and calculate a direction vector $D_i$ from the linear interpolation point $P_{Gi}$ 1101 to a subsequent linear interpolation point $P_{Gi+1}$ 1103.

Here, i may be a number that denotes which a linear interpolation point in path data.

The polygon generation unit 203 may calculate an $i^{th}$ left direction vector $D_{Li}$ using a difference between the direction vector $D_{i-1}$ and the direction vector $D_i$. The polygon generation unit 203 may generate an $i^{th}$ right direction vector $D_{Ri}$ using the difference between the direction vector $D_{i-1}$ and the direction vector $D_i$.

The polygon generation unit 203 may generate an $i^{th}$ left polygon point $N_{Li}$ 1107 at an intersecting point between a straight line 1105 that is generated from a left polygon point $N_{Li-1}$ 1104 in correspondence to the direction vector $D_{i-1}$ and a straight line 1106 that is generated from the linear interpolation point $P_{Gi}$ 1101 in correspondence to the $i^{th}$ left direction vector $D_{Li}$.

The polygon generation unit 203 may generate an $i^{th}$ right polygon point $N_{Ri}$ 1111 at an intersecting point between a straight line 1109 that is generated from a right polygon point $N_{Ri-1}$ 1107 in correspondence to the direction vector $D_{i-1}$ and a straight line 1106 that is generated from the linear interpolation point $P_{Gi}$ 1101 along the $i^{th}$ right direction vector $D_{Ri}$.

As described above, according to an embodiment of the present invention, when generating a 3D path, it is possible to be aware of a heading direction of a path based on a thickness of the 3D path by generating the 3D path based on linear interpolation points of path information.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An apparatus for generating a three-dimensional (3D) path, the apparatus comprising:
a path generation unit to generate a map using map data between a location of the 3D path generating apparatus and a destination, and to generate a path from the location to the destination on the generated map,
a polygon generation unit to generate a left polygon and a right polygon on the left and the right of path data, respectively, based on a linear interpolation point of the path data; and
a polygon conversion unit to apply a height value to the linear interpolation point to thereby generate a 3D path vertex, and to connect the left polygon and the right polygon to the 3D path vertex to thereby generate the 3D path; and
an inappropriate data removal unit to remove an inappropriate linear interpolation point in the path data and to provide, to the polygon generation unit, the path data in which the inappropriate linear interpolation point is removed,
wherein the path data includes a path having a first linear interpolation point, a second linear interpolation point immediately following the first linear interpolation point, and a third linear interpolation point immediately following the second linear interpolation point, and
wherein, when the third linear interpolation point is a retrograde linear interpolation point against a heading direction of the path, such that the retrograde linear interpolation point is closer to the first linear interpolation point of the path than the second linear interpolation point is to the first linear interpolation point of the path, the inappropriate data removal unit determines the third linear interpolation point as an inappropriate linear interpolation point to thereby remove the determined inappropriate linear interpolation point.

2. The apparatus of claim 1, wherein, when a plurality of linear interpolation points exists in the path data within a predetermined distance, the inappropriate data removal unit selects any one linear interpolation point from the plurality of linear interpolation points, and determines the remaining linear interpolation points as inappropriate linear interpolation points to thereby remove the determined inappropriate linear interpolation points.

3. The apparatus of claim 1, wherein the polygon generation unit calculates a left direction vector and a right direction vector at the linear interpolation point, generates a left polygon point and a right polygon point at the left and the right of the linear interpolation point, based on the left direction vector and the right direction vector, respectively, connects the linear interpolation point and the left polygon point to thereby generate the left polygon, and connects the linear interpolation point and the right polygon point to thereby generate the right polygon.

4. The apparatus of claim 3, wherein the polygon generation unit rotates a heading direction vector of a first linear interpolation point of the path data at a designated angle to thereby calculate a first left direction vector and a first right direction vector, and the polygon generation unit generates the left polygon point and the right polygon point at points that are moved from the first linear interpolation point to the left and the right thereof by a predetermined distance in correspondence to the first left direction vector and the first right direction vector.

5. The apparatus of claim 3, wherein the polygon generation unit calculates a heading left direction vector and a heading right direction vector at another linear interpolation point excluding a first linear interpolation point and a last linear interpolation point of the path data based on an angle difference between linear interpolation points, and the polygon generation unit generates the left polygon point at an intersecting point between a straight line corresponding to the heading left direction vector and a straight line corresponding to the heading direction of the path data based on a left polygon point that is generated at a previous linear interpolation point, and generates the right polygon point at an intersecting point between a straight line corresponding to the heading right direction vector and the straight line corresponding to the heading direction of the path data based on a right polygon point that is generated at the previous linear interpolation point, based on another linear interpolation point excluding the first linear interpolation point and the last linear interpolation point.

6. The apparatus of claim 3, wherein the polygon generation unit rotates a heading direction vector of a last linear interpolation point of the path data at a designated angle to thereby calculate a last left direction vector and a last right direction vector, and wherein the polygon generation unit generates the left polygon point and the right polygon point at points that are moved from the last linear interpolation point to the left and the right thereof by a predetermined distance in correspondence to the last left direction vector and the last right direction vector.

7. The apparatus of claim 1, wherein the polygon conversion unit triangulates the 3D path to thereby display the 3D path in a 3D form.

8. A method of generating a 3D path, the method comprising:
generating a map, by a 3D path generating apparatus, using map data between a location of the 3D path generating apparatus and a destination;
generating a path from the location to the destination on the generated map;
generating a left polygon and a right polygon on the left and the right of path data, respectively, based on a linear interpolation point of the path data;
applying a height value to the linear interpolation point to thereby generate a 3D path vertex;
connecting the left polygon and the right polygon to the 3D path vertex to thereby generate the 3D path: and
removing an inappropriate linear interpolation point in the path data,
wherein the generating of the left polygon and the right polygon comprises generating the left polygon and the right polygon on using the path data in which the inappropriate linear interpolation point is removed,
wherein the path data includes a path having a first linear interpolation point, a second linear interpolation point immediately following the first linear interpolation point, and a third linear interpolation point immediately following second linear interpolation point, and
wherein, when the third linear interpolation point is a retrograde linear interpolation point against a heading direction of the path, such that the third linear interpolation point is closer to the first linear interpolation point of the path than the second linear interpolation point is to the first linear interpolation point of the path, the removing of the inappropriate linear interpolation point comprises determining the third linear interpolation point as an inappropriate linear interpolation point to thereby remove the determined inappropriate linear interpolation point.

9. The method of claim 8, wherein, when a plurality of linear interpolation points exists in the path data within a predetermined distance, the removing of the inappropriate linear interpolation point comprises selecting any one linear interpolation point from the plurality of linear interpolation points, and determining the remaining linear interpolation points as inappropriate linear interpolation points to thereby remove the determined inappropriate linear interpolation points.

10. The method of claim 8, wherein the generating of the left polygon and the right polygon comprises:
calculating a left direction vector and a right direction vector at the linear interpolation point;
generating a left polygon point and a right polygon point at the left and the right of linear interpolation point, based on the left direction vector and the right direction vector, respectively; and
connecting the linear interpolation point and the left polygon point to thereby generate the left polygon, and connecting the linear interpolation point and the right polygon point to thereby generate the right polygon.

11. The method of claim 10, wherein the calculating of the left direction vector and the right direction vector comprises rotating a heading direction vector of a first linear interpolation point of the path data at a designated angle to thereby calculate a first left direction vector and a first right direction vector, and the generating of the left polygon point and the right polygon point comprises generating the left polygon point and the right polygon point at points that are moved from the first linear interpolation point to the left and the right thereof by a predetermined distance in correspondence to the first left direction vector and the first right direction vector.

12. The method of claim 10, wherein the calculating of the left direction vector and the right direction vector comprises calculating a heading left direction vector and a heading right direction vector at another linear interpolation point excluding a first linear interpolation point and a last linear interpolation point of the path data based on an angle difference between linear interpolation points, and the generating of the left polygon point and the right polygon point comprises generating the left polygon point at an intersecting point between a straight line corresponding to the heading left direction vector and a straight line corresponding to the heading direction of the path data based on a left polygon point that is generated at a previous linear interpolation point, and generating the right polygon point at an intersecting point between a straight line corresponding to the heading right direction vector and the straight line corresponding to the heading direction of the path data based on a right polygon point that is generated at the previous linear interpolation point, based on another linear interpolation point excluding the first linear interpolation point and the last linear interpolation point.

13. The method of claim 10, wherein the calculating of the left direction vector and the right direction vector comprises rotating a heading direction vector of a last linear interpolation point of the path data at a designated angle to thereby calculate a last left direction vector and a last right direction vector, and the generating of the left polygon point and the right polygon point comprises generating the left polygon point and the right polygon point at points that are moved from the last linear interpolation point to the left and the right thereof by a predetermined distance in correspondence to the last left direction vector and the last right direction vector.

14. The method of claim 8, further comprising:
triangulating the 3D path to display the 3D path in a 3D form.

15. A non-transitory computer-readable recording medium storing a program for implementing the method according to claim 8.

* * * * *